(12) United States Patent
Miyazaki et al.

(10) Patent No.: US 8,333,664 B2
(45) Date of Patent: Dec. 18, 2012

(54) INFORMATION PROCESSING APPARATUS, CONTROL METHOD THEREFOR, OPERATION DEVICE, AND INFORMATION STORAGE MEDIUM

(75) Inventors: Yoshio Miyazaki, Kanagawa (JP); Kazuyoshi Enomoto, Tokyo (JP); Takamasa Araki, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 60 days.

(21) Appl. No.: 13/017,236

(22) Filed: Jan. 31, 2011

(65) Prior Publication Data

US 2011/0195784 A1 Aug. 11, 2011

(30) Foreign Application Priority Data

Feb. 9, 2010 (JP) ................................ 2010-026911

(51) Int. Cl.
*A63F 9/24* (2006.01)
(52) U.S. Cl. .......................................... 463/37; 463/36
(58) Field of Classification Search ................... 463/36, 463/37
See application file for complete search history.

(56) References Cited

U.S. PATENT DOCUMENTS

| 7,532,901 | B1 * | 5/2009 | LaFranchise et al. ...... 455/456.6 |
| 2011/0256930 | A1 * | 10/2011 | Jaouen ............................ 463/37 |
| 2011/0263329 | A1 * | 10/2011 | Miyazaki et al. ............... 463/36 |

FOREIGN PATENT DOCUMENTS

WO 2009/005150 1/2009

OTHER PUBLICATIONS

Japanese Office Action dated Jan. 31, 2012, from corresponding Japanese Application No. 2010-026911.

* cited by examiner

*Primary Examiner* — Corbett B Coburn
(74) *Attorney, Agent, or Firm* — Katten Muchin Rosenman LLP

(57) ABSTRACT

Provided is an information processing apparatus, which is connected to an operation device including a magnetic sensor and an operation button used for operation input by a user, and is configured to: receive, from the operation device, a detection result of the magnetic sensor and information indicating an operation performed by the user with respect to the operation button; determine whether or not the operation button has been operated, by using the received information indicating the operation; and, when it is determined that the operation button has been operated, restrict a posture of the operation device from being identified by using the detection result of the magnetic sensor.

6 Claims, 5 Drawing Sheets

TO OPERATION DEVICE 10

INFORMATION PROCESSING APPARATUS, CONTROL METHOD THEREFOR, OPERATION DEVICE, AND INFORMATION STORAGE MEDIUM

BACKGROUND OF THE INVENTION

1. Field of the Invention

The present invention relates to an information processing apparatus connected to an operation device including an operation button and a magnetic sensor (magnetometer), and also relates to a control method therefor, an operation device, and an information storage medium.

2. Description of the Related Art

There are known various operation devices for receiving operation input from a user, such as a controller of a video game console. The user operates an operation button or the like provided to the operation device, to thereby input various kinds of instructions to an information processing apparatus. Further, some of the operation devices are provided with a posture detecting function. With the use of an operation device provided with the posture detecting function, the user can perform operation input not only by operating a button provided to the operation device but also by tilting or moving the operation device itself to change its posture.

Magnetic sensors are known as means for implementing detection of the posture of the operation device. The magnetic sensor is a sensor capable of detecting an orientation of the Earth's magnetic field. By utilizing a detection result thereof, it is possible to identify a change in orientation of the operation device equipped with the magnetic sensor.

SUMMARY OF THE INVENTION

The inventors of the subject application have found that there is a case where, when posture detection is performed with an operation device equipped with a magnetic sensor, a user's operation performed with respect to an operation button influences a detection result of the magnetic sensor. Such an influence exerted by the user's operation possibly causes an error when the posture detection is performed with the use of the magnetic sensor.

In view of the above-mentioned circumstances, the present invention has been made, and therefore has an object to provide an information processing apparatus capable of suppressing, for an operation device including an operation button and a magnetic sensor, a measurement error of the magnetic sensor, which is caused by a user's operation performed with respect to the operation button, and also provide a control method therefor, an operation device, and an information storage medium.

According to the present invention, there is provided an information processing apparatus, which is connected to an operation device including a magnetic sensor and an operation button used for operation input by a user, the information processing apparatus including: receiving section for receiving, from the operation device, a detection result of the magnetic sensor and information indicating an operation performed by the user with respect to the operation button; determining section for determining whether or not the operation button has been operated, by using the received information indicating the operation; and posture identifying section for identifying a posture of the operation device by using the received detection result of the magnetic sensor, and, when it is determined that the operation button has been operated, restricting the posture of the operation device from being identified by using the detection result of the magnetic sensor.

Further, in the information processing apparatus, the operation device may include a plurality of the operation buttons, the determining section may determine whether or not a predetermined operation button has been operated among the plurality of the operation buttons, and the posture identifying section may restrict the posture of the operation device from being identified by using the detection result of the magnetic sensor when it is determined that the predetermined operation button has been operated.

Further, the magnetic sensor may be disposed on a board integrated in the operation device, and the predetermined operation button may have a contact point thereof disposed at a position closer to the magnetic sensor on the board, compared to a contact point of another operation button.

Further, according to the present invention, there is provided a control method for an information processing apparatus connected to an operation device including a magnetic sensor and an operation button used for operation input by a user, the control method for the information processing apparatus including: receiving, from the operation device, a detection result of the magnetic sensor and information indicating an operation performed by the user with respect to the operation button; determining whether or not the operation button has been operated, by using the received information indicating the operation; and identifying a posture of the operation device by using the received detection result of the magnetic sensor, and, when it is determined that the operation button has been operated, restricting the posture of the operation device from being identified by using the detection result of the magnetic sensor.

Further, according to the present invention, there is provided an operation device, including: a magnetic sensor; an operation button used for operation input by a user; output means for outputting a detection result of the magnetic sensor; and determining section for determining whether or not the user has operated the operation button, in which the output means restricts the detection result of the magnetic sensor from being output when it is determined by the determining section that the operation button has been operated.

Further, according to the present invention, there is provided a computer-readable information storage medium having a program stored therein, the program causing a computer, which is connected to an operation device including a magnetic sensor and an operation button used for operation input by a user, to function as: receiving section for receiving, from the operation device, a detection result of the magnetic sensor and information indicating an operation performed by the user with respect to the operation button; determining section for determining whether or not the operation button has been operated, by using the received information indicating the operation; and posture identifying section for identifying a posture of the operation device by using the received detection result of the magnetic sensor, and, when it is determined that the operation button has been operated, restricting the posture of the operation device from being identified by using the detection result of the magnetic sensor.

DETAILED DESCRIPTION OF THE INVENTION

Hereinbelow, with reference to the drawings, detailed description is given of an embodiment of the present invention.

Figure 1:
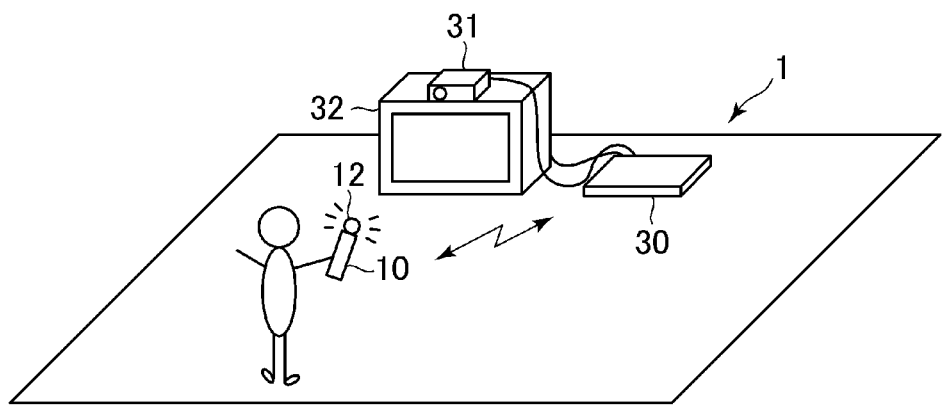
FIG. 1 is a schematic diagram illustrating an overview of an information processing system including an information processing apparatus according to an embodiment of the present invention.

FIG. 1 is a schematic diagram illustrating a use situation of an information processing system 1 including an information processing apparatus 30 according to the embodiment of the present invention. As illustrated in FIG. 1, the information processing system 1 includes an operation device 10 to be held by a user with his/her hand when used and the information processing apparatus 30. The information processing apparatus 30 is, for example, a video game console, a personal computer, or the like, and is connected to an image capture apparatus 31 and a display apparatus 32.

The operation device 10 is capable of establishing communication to the information processing apparatus 30 via a wireless communication interface compliant with, for example, the Bluetooth (registered trademark) standard. The user of the information processing system 1 holds the operation device 10 with his/her hand to operate an operation button or the like provided to the operation device 10. In response to such an operation, a content of the operation performed by the user is transmitted to the information processing apparatus 30 via the wireless communication interface. Further, in this embodiment, the operation device 10 includes a light emitting portion 12, which emits light according to an instruction from the information processing apparatus 30. The image capture apparatus 31 captures an image of the light emitted from the light emitting portion 12, and then outputs the captured image to the information processing apparatus 30. In addition, as described later, the operation device 10 includes a plurality of kinds of sensors, and transmits detection results of those sensors to the information processing apparatus 30. By using the position and the size of the light emitting portion 12 in the image captured by the image capture apparatus 31 and the detection results of the sensors integrated in the operation device 10, the information processing apparatus 30 identifies the posture (position, orientation or the like) of the operation device 10. With this configuration, the user can perform operation input with respect to the information processing apparatus 30 not only by operating the operation button or the like provided to the operation device 10 but also by moving the operation device 10 itself.

Figure 2:
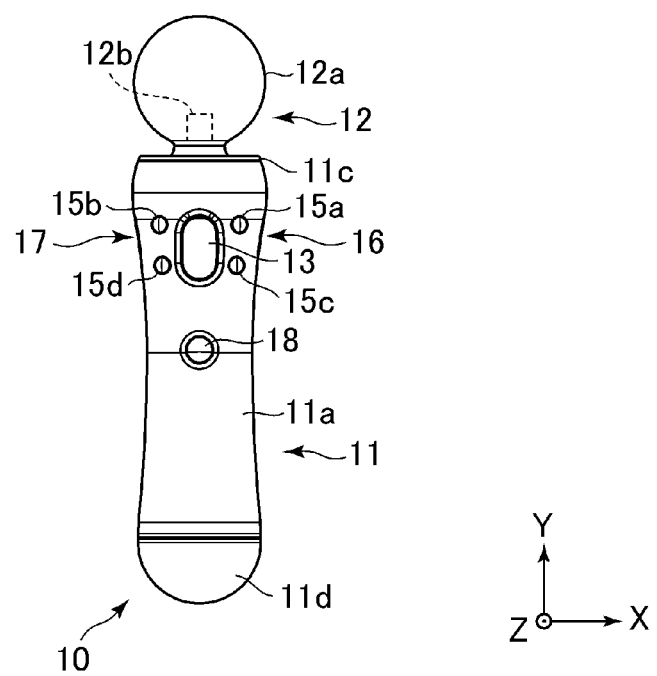
FIG. 2 is a front view of an operation device.
Figure 3:
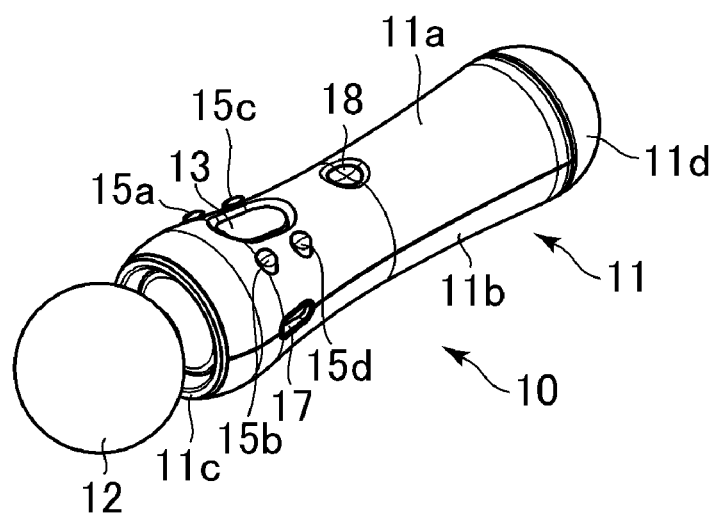
FIG. 3 is a perspective view of the operation device when viewed from a front side thereof.
Figure 4:
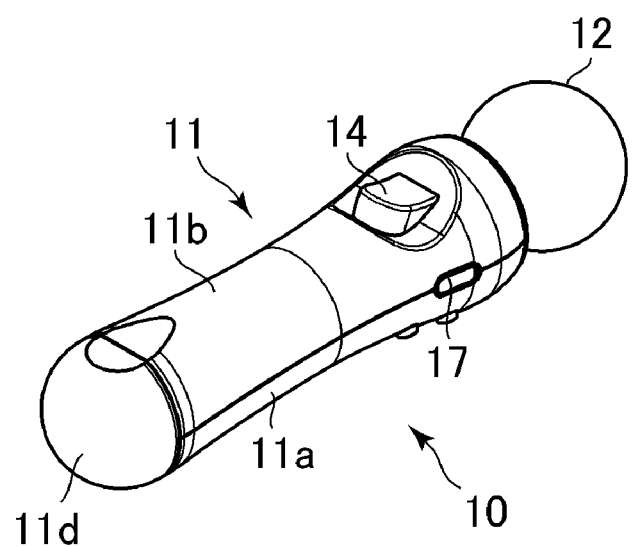
FIG. 4 is a perspective view of the operation device when viewed from a back side thereof.

Next, a structure of the operation device 10 is described. FIGS. 2 to 4 are views each illustrating an outer appearance of the operation device 10. FIG. 2 is a front view of the operation device 10. FIG. 3 is a perspective view of the operation device 10 when viewed from a front side thereof. FIG. 4 is a perspective view of the operation device 10 when viewed from a back side thereof. As illustrated in FIGS. 2 to 4, the operation device 10 includes a main body portion 11 and the light emitting portion 12, and the main body portion 11 is provided with a plurality of operation buttons on a side surface thereof. The user holds substantially the center of the main body portion 11, and performs operation input by depressing the operation buttons with his/her thumb and fingers. Note that, hereinbelow, a horizontal direction of the operation device 10 is represented by an X-axis, a vertical direction (longitudinal direction) thereof is represented by a Y-axis, and an antero-posterior direction thereof is represented by a Z-axis.

The main body portion 11 is formed in a column shape as a whole, and has the light emitting portion 12 attached to one end thereof. Specifically, an enclosure of the main body portion 11 is formed of a front portion 11a, a back portion 11b, a top portion 11c, and a bottom portion 11d. The front portion 11a and the back portion 11b each have a shape obtained by cutting a cylinder in half along its longitudinal direction. Those portions are combined together to form the side surface of the main body portion 11 having a cylindrical shape. The top portion 11c is formed in a disk shape having an opening at its center. Through the opening, the light emitting portion 12 is connected to a board 20 integrated in the main body portion 11. The bottom portion 11d is formed in a semi-spherical shape.

The light emitting portion 12 includes a spherical outer shell 12a formed of a light transmissive material, such as a silicone resin, and a plurality of LEDs 12b disposed thereinside. In this embodiment, three LEDs 12b corresponding to the three primary colors of light each emit light with an intensity corresponding to an instruction from the information processing apparatus 30, thereby enabling the light emitting portion 12 to emit light with various colors.

On the surface of the enclosure of the main body portion 11, as the operation buttons to be operated by the user, there are disposed a main button 13, a trigger button 14, auxiliary buttons 15a to 15d, a start button 16, a select button 17, and a power button 18. Specifically, the main button 13, the auxiliary buttons 15a to 15d, and the power button 18 are disposed in respective openings formed in the front portion 11a. The trigger button 14 is disposed in an opening formed in the back portion 11b. Further, the start button 16 and the select button 17 are disposed at positions on boundaries between the front portion 11a and the back portion 11b. Hereinbelow, description is given of a disposition of those operation buttons.

The main button 13 is disposed, on the front side of the operation device 10, at a position at which the thumb is placed when the user holds the operation device 10 with his/her hand. The trigger button 14 is disposed on the back side of the operation device 10 (that is, side opposite to the side where the main button 13 is disposed) so as to be opposed to the main button 13. The user holds a portion in the vicinity of the center of the main body portion 11, and can operate the trigger button 14 with his/her index finger while operating the main button 13 with his/her thumb. Note that, instead of simply outputting binary information indicating whether or not the button is depressed by the user, the trigger button 14 is capable of detecting a degree to which the button is depressed by the user and outputting information indicating a depression amount.

Around the main button 13, the four auxiliary buttons 15a to 15d are disposed so as to surround the main button 13. Those auxiliary buttons 15a to 15d are used for various kinds of operation input along with the main button 13 during execution of an application program.

The start button 16 and the select button 17 are used by the user to start a game, make a selection, make a pause, etc. when the information processing apparatus 30 executes a game application program, for example. The start button 16 is disposed on a right side surface of the main body portion 11, whereas the select button 17 is disposed on a left side surface of the main body portion 11 so as to be opposed to the start button 16.

The power button 18 is disposed, at the front of the main body portion 11, below the position at which the main button 13 is disposed. The power button 18 is used for powering on the operation device 10 to start operation thereof or powering off the operation device 10 to terminate the operation.

Figure 5:
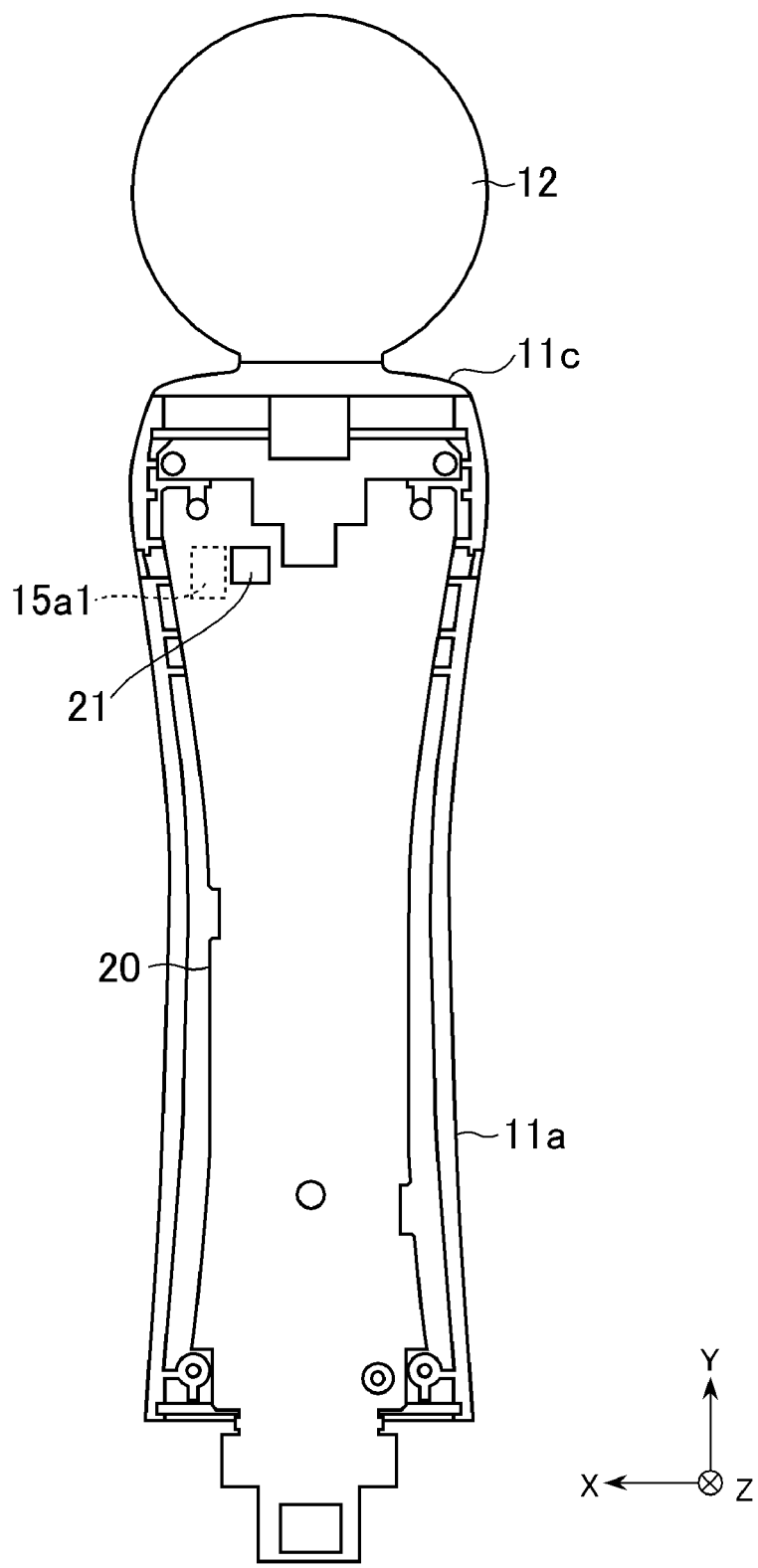
FIG. 5 is a diagram illustrating a disposition of a board inside the operation device.

Further, the board 20 is disposed inside the main body portion 11. FIG. 5 is a diagram illustrating a disposition of the board 20 inside the operation device 10. FIG. 5 illustrates a view from the back side of the operation device 10, in which the bottom portion 11*d* and the back portion 11*b* constituting the enclosure of the main body portion 11 are removed from the operation device 10. As illustrated in FIG. 5, the board 20 has a substantially rectangular shape, and is disposed in parallel to the X-axis and the Y-axis of the operation device 10.

As illustrated in FIG. 5, a magnetic sensor 21 is disposed on a surface of the board 20 on the back side of the operation device 10. In this embodiment, the magnetic sensor 21 is a three-axis magnetic sensor, which detects, with an XY plane, a YZ plane, and a ZX plane of the operation device 10 set as reference planes, orientations of the Earth's magnetic field with respect to the respective reference planes. By analyzing a temporal change in detection result of the Earth's magnetic field for each plane, it is possible to identify a change in orientation of the operation device 10. Note that, though not illustrated, the operation device 10 also has an acceleration sensor and a gyroscope integrated therein as sensors for detecting the posture and the movement of the operation device 10, in addition to the magnetic sensor 21.

Figure 6:
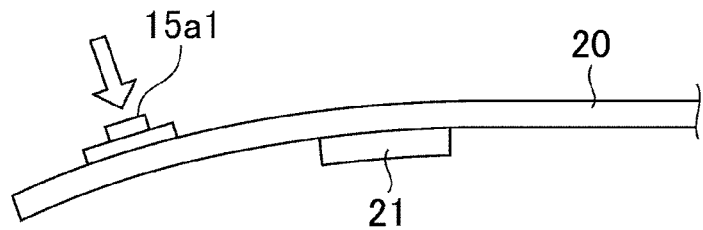
FIG. 6 is an explanatory diagram schematically illustrating an influence on a magnetic sensor, which is exerted by an operation with respect to an operation button.

Further, on a surface of the board 20 on the front side of the operation device 10, there are disposed contact points for the main button 13, the auxiliary buttons 15*a* to 15*d*, and the power button 18. Because the contact points are disposed on the board 20, when the user performs operations of depressing those buttons, forces are applied to the board 20. Then, when a force is applied to a contact point disposed at a position close to the position of the magnetic sensor 21 on the board 20, a slight deformation is conceivably caused in the board 20 by this force, influencing measurement results of the magnetic sensor 21. FIG. 6 is an explanatory diagram schematically illustrating a change in orientation of the magnetic sensor 21, which possibly occurs due to the above-mentioned deformation of the board 20. As an example, FIG. 6 illustrates a case where a force is applied to a contact point 15*a*1 of the auxiliary button 15*a*. Note that, in FIG. 6, the deformation of the board 20 is illustrated in an exaggerating manner for the convenience of description. Fluctuations in measurement results of the magnetic sensor 21, which are caused by such an influence as described above, occur despite a fact that the orientation of the operation device 10 itself has not been changed. Therefore, in a case where the posture of the operation device 10 is detected by using the measurement results of the magnetic sensor 21, measurement errors are caused by the fluctuations.

Such measurement errors of the magnetic sensor 21 are thought to occur when a particular button is operated among the plurality of the operation buttons provided to the operation device 10. Specifically, when the user operates the auxiliary button 15*a*, the measurement results of the magnetic sensor 21 are influenced, in particular. This is because the auxiliary button 15*a* has the contact point 15*a*1 disposed at a position closer to the magnetic sensor 21 on the board 20, compared to the contact points of the other operation buttons. Note that, in FIG. 5, the position of the contact point 15*a*1 when viewed from a back side of the board 20 is indicated by broken lines. To address this, the information processing apparatus 30 according to this embodiment executes processing for avoiding the measurement errors of the magnetic sensor 21, which are caused by the operation performed by the user with respect to the operation button.

Figure 7:
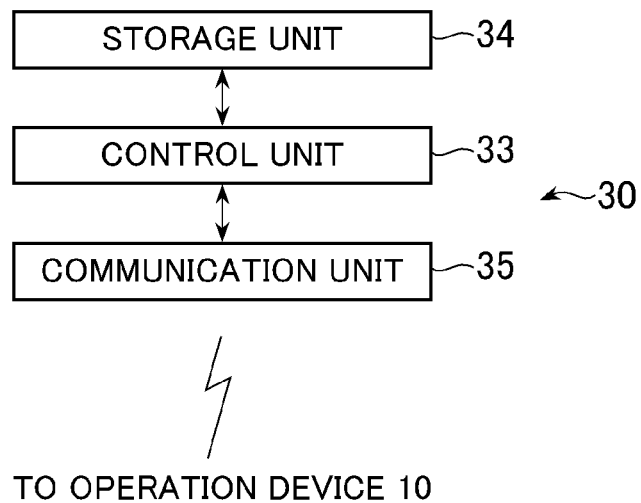
FIG. 7 is a configuration block diagram illustrating a configuration of the information processing apparatus according to the embodiment of the present invention.

Next, a configuration of the information processing apparatus 30 is described. As illustrated in FIG. 7, the information processing apparatus 30 includes a control unit 33, a storage unit 34, and a communication unit 35.

The control unit 33 is a program control device such as a CPU, and performs various kinds of information processing according to a program stored in the storage unit 34. The processing executed by the control unit 33 in this embodiment is described later.

The storage unit 34 includes a memory device such as a RAM or a ROM, and stores the program executed by the control unit 33 and various kinds of data used for the processing executed by the control unit 33. Further, the storage unit 34 functions as a working memory for the control unit 33. In particular, in this embodiment, information transmitted from the operation device 10 is temporarily stored in the storage unit 34.

The communication unit 35 is a wireless communication interface compliant with, for example, the Bluetooth (registered trademark) standard, and performs transmission/reception of information with the operation device 10.

Figure 8:
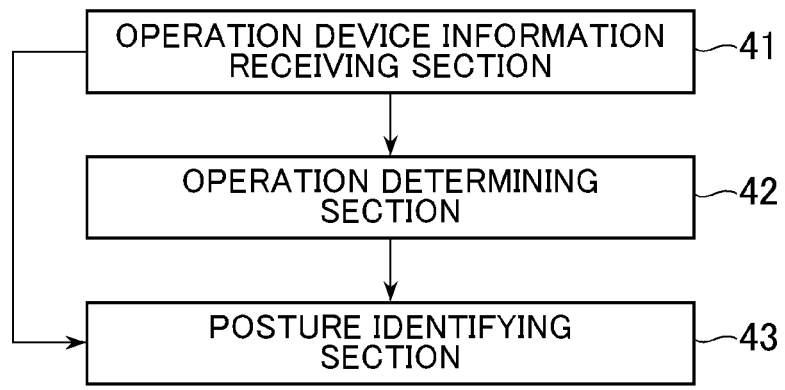
FIG. 8 is a functional block diagram illustrating functions of the information processing apparatus according to the embodiment of the present invention.

Hereinbelow, description is given of functions implemented by the information processing apparatus 30 in this embodiment. As illustrated in FIG. 8, the information processing apparatus 30 functionally includes an operation device information receiving section 41, an operation determining section 42, and a posture identifying section 43. Those functions are implemented by the control unit 33 executing the program stored in the storage unit 34. This program may be provided to the information processing apparatus 30 via, for example, a communication network such as the Internet, or may be provided by being stored in various kinds of computer-readable information storage media such as an optical disk.

The operation device information receiving section 41 receives, at predetermined time intervals (for example, every 11.25 ms), information transmitted from the operation device 10. Here, the information received from the operation device 10 contains information indicating an operation performed by the user with respect to the operation button provided to the operation device 10 (hereinbelow, referred to as operation information). Further, the information received from the operation device 10 also contains information indicating detection results of the sensors (that is, magnetic sensor 21, acceleration sensor, and gyroscope) provided to the operation device 10 (hereinbelow, referred to as sensor information).

By using the operation information received by the operation device information receiving section 41, the operation determining section 42 determines whether or not the user has operated a particular operation button (here, auxiliary button 15*a*) among the plurality of the operation buttons provided to the operation device 10. Specifically, the operation determining section 42 refers to the operation information, and, if the operation information contains therein information indicating that the auxiliary button 15*a* is being depressed, determines that the user is operating the auxiliary button 15*a*. Note that, the operation determining section 42 may store information indicating a state of the auxiliary button 15a (whether or not the auxiliary button 15a is depressed) obtained when a previous determination was performed, to thereby determine, when a determination is newly performed, whether or not an operation has been performed based on whether or not the state of the auxiliary button 15a has been changed from the state obtained when the previous determination was performed. In this case, at a timing at which the user starts to depress the auxiliary button 15a and a timing at which the user releases the auxiliary button 15a, the operation determining section 42 determines that an operation has been performed with respect to the auxiliary button 15a. During a period in which the user keeps depressing the auxiliary button 15a, the operation determining section 42 determines that no operation is being performed with respect to the auxiliary button 15a.

By using the sensor information received by the operation device information receiving section 41 and the image captured by the image capture apparatus 31, the posture identifying section 43 performs posture identifying processing in which the posture (that is, position and orientation in the actual space) of the operation device 10 is identified. By repeating such processing at predetermined time intervals, the information processing apparatus 30 can continuously monitor how the user is moving the operation device 10, and execute information processing according to the movement. Specifically, the posture identifying section 43 identifies the position of the light emitted from the light emitting portion 12 in the image captured by the image capture apparatus 31, to thereby identify the direction of the light emitting portion 12 with respect to the position of the image capture apparatus 31. Further, by using the size of the light emitting portion 12 in the captured image, the posture identifying section 43 identifies a distance from the image capture apparatus 31 to the light emitting portion 12. Further, by using the detection results of the magnetic sensor 21, the posture identifying section 43 identifies the orientation of the operation device 10. Further, in order to identify the position and the orientation of the operation device 10, the detection results of the acceleration sensor and the gyroscope may be used.

In addition, in this embodiment, when the operation determining section 42 determines that an operation is being performed with respect to the auxiliary button 15a, the posture identifying section 43 restricts the execution of the posture identifying processing that uses the magnetic sensor 21. Specifically, the posture identifying section 43 identifies the posture of the operation device 10 using other pieces of information alone (that is, the image captured by the image capture apparatus 31 and the detection results of the acceleration sensor and the gyroscope) without using information on the detection results of the magnetic sensor 21, which is received along with the operation information used for the determination by the operation determining section 42. With this configuration, when the user has operated the auxiliary button 15a, the posture identifying section 43 restricts the use of the detection results of the magnetic sensor 21 just for the posture identifying processing performed at the corresponding timing thereto, and hence it is possible to exclude an error caused by the operation of the user at the time of identifying the posture.

Note that, in the description above, when the user has operated the auxiliary button 15a, the posture identifying section 43 executes the posture identifying processing without using any of the measurement results of the magnetic sensor 21. However, only some of the measurement results of the magnetic sensor 21 may be prevented from being used. For example, the posture identifying section 43 may restrict the use of a measurement result obtained from a particular reference plane alone, whose detection result is expected to be influenced by the operation of the user, among the measurement results with respect to the three reference planes. To give a specific example, the posture identifying section 43 restricts the use of the measurement result of a reference plane having a direction thereof in parallel to a direction in which the operation button is depressed by the operation performed by the user (that is, direction in which the user's force is applied). The auxiliary button 15a is operated in a direction from the front side toward the back side of the operation device 10, that is, in a Z-axis direction. Accordingly, when the auxiliary button 15a has been operated, the posture identifying section 43 does not use the detection results obtained from the magnetic sensor 21 with respect to the YZ plane and the ZX plane, and uses only the detection result with respect to the XY plane for the posture identifying processing.

Alternatively, the following configuration may be adopted. That is, at a timing at which the user has operated the auxiliary button 15a, the posture identifying section 43 does not use any detection results of the sensors including the magnetic sensor 21, which are transmitted from the operation device 10, and executes only the processing of detecting the position of the operation device 10 based on the image captured by the image capture apparatus 31. Still alternatively, without detecting even the position of the operation device 10 based on the captured image, processing relating to an application program may be executed, assuming that the position and the posture of the operation device 10 have not been changed at that timing (or assuming that the operation device 10 is making a predetermined movement at a constant velocity).

Figure 9:
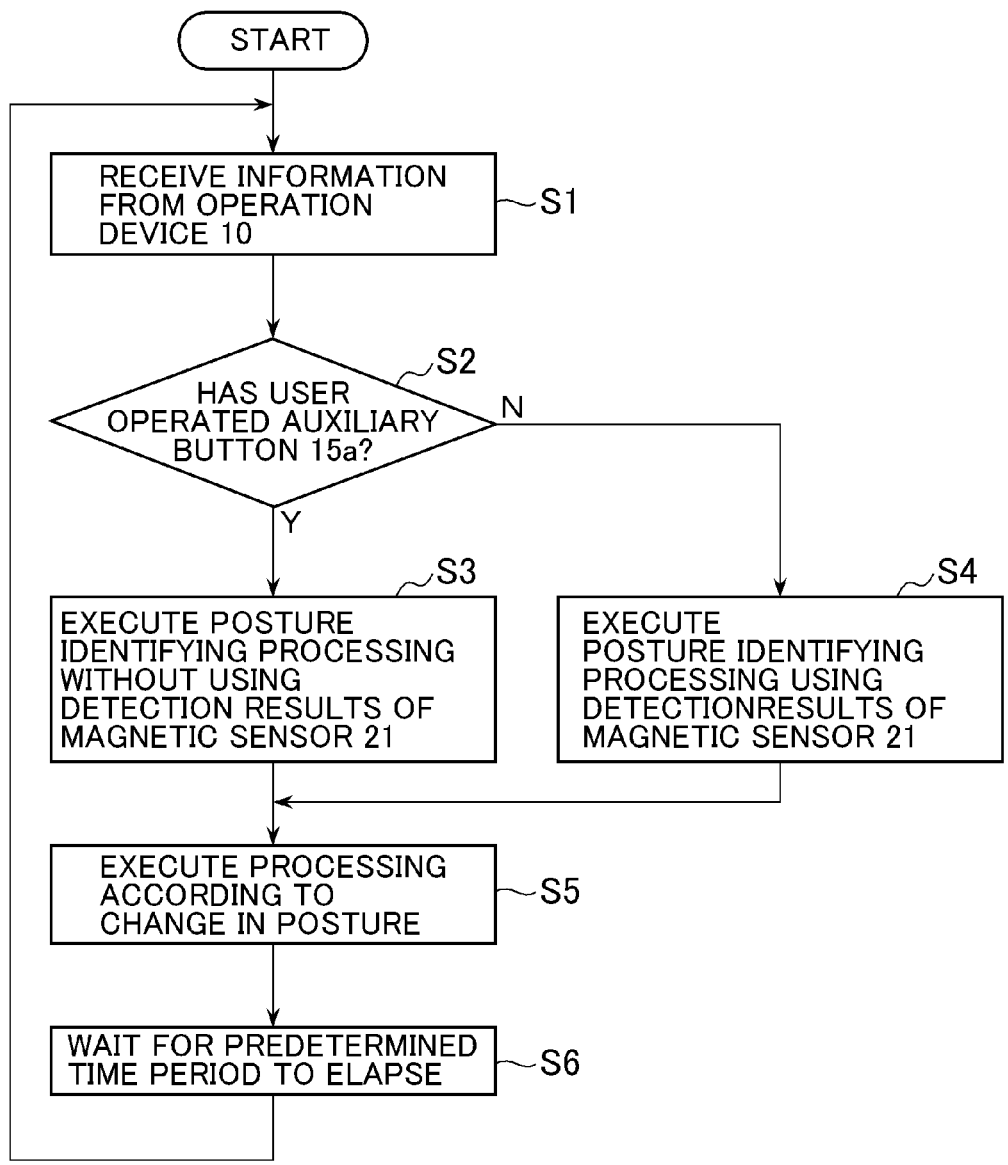
FIG. 9 is a flow chart illustrating a flow of processing executed by the information processing apparatus according to the embodiment of the present invention.

Here, with reference to a flow chart of FIG. 9, description is given of an example of a flow of the processing executed by the control unit 33.

First, the control unit 33 receives the operation information and the sensor information which are transmitted from the operation device 10 (S1). Then, the control unit 33 determines whether or not the operation information received in S1 indicates that the user has operated the auxiliary button 15a (S2).

When it is determined in S2 that the user has operated the auxiliary button 15a, the control unit 33 executes the posture identifying processing without using the detection results of the magnetic sensor 21, which are contained in the sensor information received in S1 (S3). On the other hand, when it is determined in S2 that the user has not operated the auxiliary button 15a, the control unit 33 executes the posture identifying processing using the detection results of the magnetic sensor 21 (S4). In both cases of S3 and S4, based on posture information on the operation device 10 which is obtained as a result of the posture identifying processing, the control unit 33 executes information processing of reflecting a change in posture of the operation device 10, such as updating the content of an image displayed on the display apparatus 32 (S5).

After that, the control unit 33 waits for a predetermined time period (for example, 11.25 ms) to elapse (S6), and then returns to S1 to repeat the processing. With such a flow of the processing, the control unit 33 can regularly receive the operation information transmitted from the operation device 10, and can restrict the posture identifying processing that uses the detection results of the magnetic sensor 21 only when the operation information indicating that the user has operated the auxiliary button 15a has been received.

According to the information processing apparatus 30 of this embodiment described above, when an operation that possibly influences the detection results of the magnetic sensor 21 has been performed by the user with respect to the operation device 10, the posture identifying processing that uses the detection results of the magnetic sensor 21 is restricted, and hence it is possible to avoid the occurrence of an error caused by the user's operation in the posture identifying processing.

Note that, the embodiment of the present invention is not limited to the description above. For example, in the description above, when the user has operated the auxiliary button 15a, the use of the detection results of the magnetic sensor 21 is restricted. However, the present invention is not limited thereto, and, when the user has operated another operation button, the information processing apparatus 30 may restrict the execution of the posture identifying processing that uses the detection results of the magnetic sensor 21. Alternatively, when it is determined that the user has operated any one of a plurality of predetermined operation buttons or all of the plurality of predetermined operation buttons, the information processing apparatus 30 may restrict the use of the detection results of the magnetic sensor 21. Still alternatively, in a case where it is determined, for each of the plurality of operation buttons, whether or not an operation has been performed by the user, the information processing apparatus 30 may just avoid, depending on which operation button has been performed, using a detection result for a reference plane corresponding to a direction in which the operation button has been operated among the three detection results of the magnetic sensor 21 with respect to the three respective reference planes.

Further, in the description above, when it is determined that the user has operated a particular operation button based on the operation information received by the operation device information receiving section 41, only the detection results of the magnetic sensor 21, which are received along with that operation information, are prevented from being used. However, for example, when it is determined that the user has operated the auxiliary button 15a, the posture identifying section 43 may restrict the use of the detection results of the magnetic sensor 21 for a predetermined period from that time point.

Further, in the description above, the information processing apparatus 30 determines whether or not the user has operated a particular operation button of the operation device 10. However, the operation device 10 may execute such determination processing as described above. In this case, an arithmetic element integrated in the operation device 10 performs the determination processing with respect to a signal output from a particular operation button of the operation device 10, to thereby determine whether or not the particular operation button has been operated. Then, when it is determined that the particular operation button has been operated, the arithmetic element restricts output of the detection results obtained from the magnetic sensor 21 at a timing corresponding to that operation timing. With this configuration, when the user has operated a particular operation button, external output of the detection results of the magnetic sensor 21 itself is restricted, and hence it is possible to prevent the information processing from being executed based on the detection results that possibly contain errors.

Further, the operation device 10 and the information processing apparatus 30 may be configured in an integrated manner. For example, when the information processing apparatus 30 is a portable game machine, a personal digital assistant, or such other device, instead of an external operation device, the information processing apparatus 30 itself includes a magnetic sensor and operation buttons. Even in this case, when the user has operated a particular operation button, the information processing apparatus 30 restricts the use of the detection results obtained from the magnetic sensor at that timing, and hence it is possible to avoid the measurement errors of the magnetic sensor which are caused by the operation performed by the user.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing apparatus, which is connected to an operation device comprising a magnetic sensor, a posture detecting sensor for detecting a posture of the operation device, and an operation button used for operation input by a user, the information processing apparatus comprising:
   a receiving section for receiving, from the operation device, a detection result of the magnetic sensor and information indicating an operation performed by the user with respect to the operation button;
   a determining section for determining whether or not the operation button has been operated, by using the received information indicating the operation; and
   a posture identifying section for identifying,
      when the determining section determines that the operation button has been operated, the posture of the operation device without the use of an output from the magnetic sensor but by using posture detecting sensor, and
      when the determining section determines that the operation button has not been operated, the posture of the operation device with the use of an output from the magnetic sensor and the detecting sensor.

2. The information processing apparatus according to claim 1, wherein:
   the operation device comprises a plurality of the operation buttons;
   the determining section determines whether or not a predetermined operation button has been operated among the plurality of the operation buttons; and
   the posture identifying section restricts the posture of the operation device from being identified by using the detection result of the magnetic sensor when it is determined that the predetermined operation button has been operated.

3. The information processing apparatus according to claim 2, wherein:
   the magnetic sensor is disposed on a board integrated in the operation device; and
   the predetermined operation button has a contact point thereof disposed at a position closer to the magnetic sensor on the board, compared to a contact point of another operation button.

4. A control method for an information processing apparatus connected to an operation device comprising a magnetic sensor, a posture detecting sensor for detecting a posture of the operation device, and an operation button used for operation input by a user,
   the control method for the information processing apparatus comprising:
   receiving, from the operation device, a detection result of the magnetic sensor and information indicating an operation performed by the user with respect to the operation button;
   determining whether or not the operation button has been operated, by using the received information indicating the operation; and identifying a posture of the operation device,
> when the determining section determines that the operation button has been operated, without the use of an output from the magnetic sensor but by using posture detecting sensor, and
> when the determining section determines that the operation button has not been operated, with the use of an output from the magnetic sensor and the posture detecting sensor.

5. An operation device, comprising:
a magnetic sensor;
a posture detecting sensor for detecting a posture of the operation device,
an operation button used for operation input by a user;
output means for outputting a detection result of the magnetic sensor; and
determining section for determining whether or not the user has operated the operation button,
wherein the output means,
> when the determining section determines that the operation button has been operated, outputs an output of a posture detecting sensor, and
> when the determining section determines that the operation button has not been operate outputs an output from the magnetic sensor and the output of the posture detecting sensor.

6. A non-transitory computer readable medium having a program stored therein,
the program causing a computer, which is connected to an operation device comprising a magnetic sensor, a posture detecting sensor for detecting a posture of the operation device, and an operation button used for operation input by a user, to function as:
receiving section for receiving, from the operation device, a detection result of the magnetic sensor and information indicating an operation performed by the user with respect to the operation button;
determining section for determining whether or not the operation button has been operated, by using the received information indicating the operation; and
a posture identifying section for identifying,
> when the determining section determines that the operation button has been operated, the posture of the operation device without the use of an output from the magnetic sensor but by using posture detecting sensor, and
> when the determining section determines that the operation button has not been operated, the posture of the operation device with the use of an output from the magnetic sensor and the posture detecting sensor.

* * * * *